Aug. 26, 1924.
H. W. ALDEN ET AL
1,506,037
DRIVING AXLE CONSTRUCTION
Filed July 5, 1922
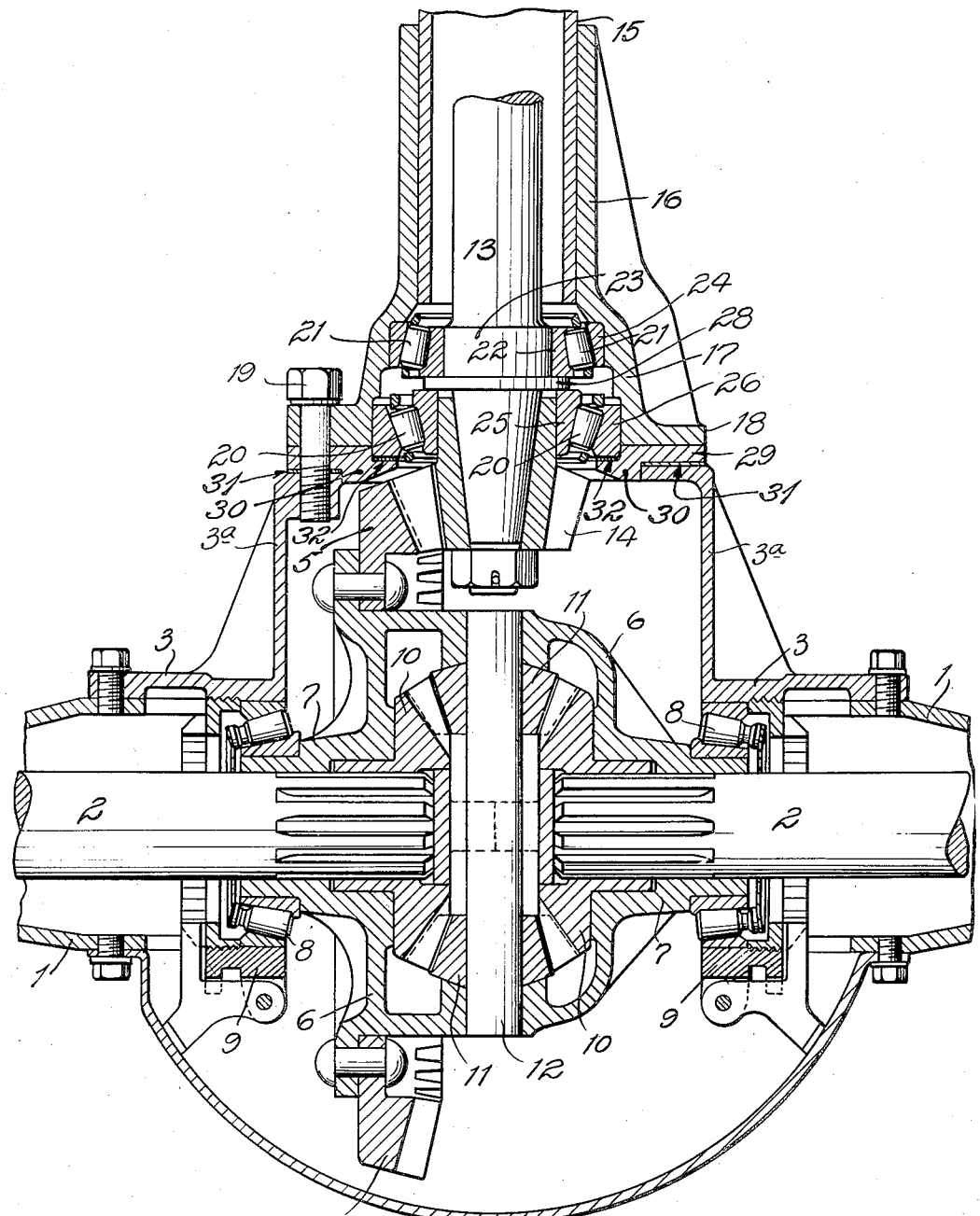
Inventors:
Herbert W. Alden
and Lawrence R. Buckendale,
by Carr & Carr,
their Attorneys.

Patented Aug. 26, 1924.

1,506,037

UNITED STATES PATENT OFFICE.

HERBERT W. ALDEN AND LAWRENCE R. BUCKENDALE, OF DETROIT, MICHIGAN, ASSIGNORS TO THE TIMKEN-DETROIT AXLE COMPANY, OF DETROIT, MICHIGAN, A CORPORATION OF MICHIGAN.

DRIVING-AXLE CONSTRUCTION.

Application filed July 5, 1922. Serial No. 572,874.

*To all whom it may concern:*

Be it known that we, HERBERT W. ALDEN and LAWRENCE R. BUCKENDALE, citizens of the United States, and residents of the city of Detroit, county of Wayne, and State of Michigan, have invented a new and useful Improvement in Driving-Axle Constructions, of which the following is a specification.

This invention relates to driving axle constructions for motor vehicles and particularly to the manner of supporting the inner end of the propeller shaft and the bearings therefor. The principal objects of the present invention are to provide proper support for the bearings that support the inner end of the propeller shaft, to provide means for readily adjusting said bearings and the depth of enmeshment of the propeller shaft pinion and the large driven gear of the differential, and to obtain other advantages hereinafter appearing. The invention consists in the combinations and arrangements of parts hereinafter described and claimed.

The accompanying drawing, which forms part of this specification and wherein like reference numerals indicate like parts wherever they occur, is a central horizontal section through the middle portion of an automobile driving axle embodying our invention.

The driving axle, of which only the middle portion is shown, comprises a hollow axle casing or housing 1, within which is mounted a pair of axially alined driving axle or shaft sections 2, whose outer ends project endwise from the housing and carry the road wheels (not shown) of the vehicle. The middle portion of the axle housing is enlarged to form a chamber for the differential gear and is provided with openings in its front and rear walls. A differential gear cage or carrier 3 is removably secured to the front wall of the axle housing and projects through the opening therein and supports the differential gear and the bearings therefor. The gear carrier closes the opening in the front wall of the axle housing; and a cover 4 closes the opening in the rear wall of said axle housing, whereby said differential gear is completely enclosed.

The differential gear comprises a large bevel driven gear 5 fixed to a drum or housing 6 having tubular hubs 7 journaled in conical roller bearings 8 adjustably held in pedestals 9 that project into the axle housing in axial alinement with the driving shaft sections 2. The inner ends of the driving shafts are keyed in the hub portions of the two opposed bevel side gears 10 of the differential gear; and the hub portions of said gears are journaled in the tubular hub portions 7 of the differential gear drum 6. The bevel pinions 11 of the differential gear mesh with the two opposed side gears 10 thereof and are rotatably mounted on a stud 12 carried by the differential gear drum or casing 6.

The differential gear carrier 3 has a forwardly projecting tubular nose portion 3ª, whose end wall is provided with a central circular opening; and extending into said nosing through the opening therein is a propeller shaft 13. The differential gear drum is rotated from the propeller shaft by means of a bevel drive pinion 14, which is keyed on the rear end of said shaft and meshes with the large gear 5 fixed to said drum.

Surrounding the propeller shaft is a torque tube 15, whose rear end has fixed thereto a tubular extension or sleeve 16 having an enlarged rear end portion 17 provided with an annular flange 18 that is concentric with the circular opening in the end of the forwardly projecting nose portion 3ª of the differential gear carrier 3 and is rigidly secured to said nose portion by bolts 19. The rear end of the propeller shaft is journaled in adjustable tapered roller bearings 20 and 21 mounted in the enlarged rear end portion 17 of the tubular extension 16 of the torque tube 15, said extension constituting a carrier for said bearings.

The tapered roller bearings 20 and 21 are adapted to take care of the radial load of the drive pinion and are arranged with the larger ends of their rollers towards each other in order to take up the end thrust in either direction due to the bevel pinion and the use of the bevel gears having helical teeth. In driving axle constructions of the kind shown in the drawing, the driving gear 5 and the driving pinion 14 are preferably provided with right-hand helical teeth, thereby causing a rearward thrust of the propeller shaft during the forward drive. For this reason, the rollers of the inner roller bearing 20 are preferably larger than the rollers of the outer roller bearing 21 that takes care of the end thrust during the reverse drive.

The forward end of the torque tube is adapted to be connected to the frame of the vehicle (not shown), whereby said tube serves to resist torsional stresses that tend to rotate the axle housing and serves also to transmit the forward thrust of the axle to the frame of the vehicle; and the forward end of the propeller shaft is adapted to be connected to the transmission gear (not shown) to be driven thereby. The manner of connecting the forward end of the torque tube to the vehicle frame, together with the manner of connecting the forward end of the propeller shaft to the transmission gear, is well known and, therefore, it is considered unnecessary to illustrate these connections.

The cone or inner bearing member 22 of the outer roller bearing 21 is mounted on an enlarged portion 23 of the propeller shaft; and the cup or outer bearing member 24 of said roller bearing fits in the angle formed by the enlarged rear end portion of the extension 16 of the torque tube. The cone or inner bearing member 25 of the inner roller bearing 20 is placed on the forwardly extending hub portion of the drive pinion 14; and the cup or outer bearing member 26 of said roller bearing fits in an annular recess formed therefor in the enlarged end portion of the torque tube extension 16. The propeller shaft is provided with an annular flange or rib 28; and the inner bearing members or cones of the roller bearings 20 and 21 are arranged on opposite sides of said rib, whereby said rib serves as a combined abutment and spacer for said inner bearing members or cones.

Located between the adjacent ends of the torque tube extensions 16 and the forwardly extending nose portion 3ª of the differential carrier 3 is a spacing member 29 comprising an annular plate having an axially offset flange 30 at its inner circumference. This flange has a snug fit in the opening in the end wall of the tubular nose portion of the differential carrier and extends across the adjacent inner end of the cup or outer bearing member 26 of the inner roller bearing 20. Shims 31 are arranged between the spacer ring 29 and the end wall of the nose portion of the carrier; and shims 32 are arranged between the offset flange 30 of said spacer ring and the adjacent inner end of the cup or outer bearing member 26 of the inner roller bearing 25.

The arrangement just described permits easy adjustment of the depth of enmeshment of the drive pinion 14 and the large driven differential gear 5 by the use of a greater or lesser number of shims 31; and it also permits the roller bearings to be readily adjusted longitudinally of the torque tube by the use of a greater or lesser number of the shims 32. The invention is not restricted to the precise forms and arrangements of parts shown in the drawing.

What we claim is:

1. The combination with a driving axle comprising a differential mechanism and a propeller shaft operatively connected to said differential mechanism, of a torque tube surrounding said propeller shaft and having one end removably secured to said driving axle, and a pair of conical roller bearings intervening between said torque tube and said propeller shaft, said torque tube having internal shoulders forming abutments for the outer ends of said bearings and said propeller shaft having an external shoulder located between the opposed ends of said bearings and forming a spacer and abutment therefor.

2. A driving axle comprising a differential mechanism, and a propeller shaft operatively connected to said differential mechanism, a torque tube surrounding said propeller shaft and having one end rigidly secured to said driving axle, a pair of conical roller bearings intervening between said torque tube and said propeller shaft, said torque tube having internal shoulders forming abutments for the outer ends of said bearings and said propeller shaft having an external shoulder located between the opposed ends of said bearings and forming a spacer and abutment therefor, and means for adjusting said torque tube longitudinally of its axis.

3. A driving axle comprising a differential mechanism, a propeller shaft operatively connected to said differential mechanism and provided with an annular rib, a torque tube surrounding said propeller shaft and having one end removably secured to said driving axle, roller bearings interposed between said torque tube and said propeller shaft and arranged on opposite sides of said annular rib with their opposing ends in contact therewith, said torque tube having an internal shoulder forming an abutment for the outer end of the outer bearing and having a member at its inner end forming an abutment for the inner end of the inner bearing, and shims between said inner bearing and said torque tube member, whereby said bearings are adapted to be adjusted longitudinally of said torque tube.

4. A driving axle comprising a differential mechanism, a propeller shaft operatively connected to said differential mechanism and provided with an annular rib, a torque tube surrounding said propeller shaft and having one end removably secured to said driving axle, roller bearings interposed between said torque tube and said propeller shaft and arranged on opposite sides of said annular rib with their opposing ends in contact therewith, said torque tube having an internal shoulder forming an abutment for the outer end of the outer bearing and having a member at its inner end forming an abutment for the inner end of the inner bearing, shims between said inner bearing and said torque tube member, whereby said bearings are adapted to be adjusted longitudinally of said torque tube, and shims between said torque tube member and the driving axle, whereby said torque tube is adapted to be adjusted longitudinally of its axis to vary the location of the inner end of the propeller shaft with relation to the differential mechanism.

5. In a motor vehicle, a hollow axle housing, a differential gear in said housing, a propeller shaft operatively connected with said differential gear, a torque tube surrounding said propeller shaft and having one end secured to said hollow axle, roller bearings intervening between said propeller shaft and said torque tube, and an annular plate between said axle housing and said torque tube, said annular plate extending across the innermost roller bearing and forming an abutment therefor.

6. In a motor vehicle, a hollow axle housing, a differential gear and driving shaft sections in said housing, a propeller shaft operatively connected with said differential gear, a torque tube surrounding said propeller shaft and having one end secured to said hollow axle housing, roller bearings intervening between said propeller shaft and said torque tube, an annular plate extending across the innermost roller bearing and forming an abutment therefor, and shims between said annular plate and said hollow axle housing.

7. In a motor vehicle, a hollow axle housing, a differential gear in said housing, a propeller shaft operatively connected with said differential gear, a torque tube surrounding said propeller shaft and having one end secured to said hollow axle, a pair of roller bearings intervening between said propeller shaft and said torque tube, an annular plate extending across the innermost roller bearing and forming an abutment therefor, shims between said annular plate and said hollow axle housing, and shims between said annular plate and said innermost roller bearing.

8. In a motor vehicle, a hollow axle housing, a differential gear in said axle housing, a propeller shaft having a driving pinion fixed thereto and meshing with the driving member of said differential gear, a torque tube surrounding said propeller shaft and removably secured to said axle housing, a roller bearing intervening between said propeller shaft and said torque tube, a roller bearing intervening between an elongated hub portion of said propeller shaft pinion and said torque tube, said propeller shaft having an external shoulder disposed between the opposed ends of said roller bearings and forming an abutment therefor and said torque tube having an internal shoulder forming an abutment for the outer end of said first mentioned bearing, and an annular plate located between said torque tube and said axle housing and forming an abutment for the inner end of said second mentioned bearing.

9. In a motor vehicle, a hollow axle housing, a differential gear in said axle, a propeller shaft having a driving pinion fixed thereto and meshing with the driving member of said differential gear, a torque tube surrounding said propeller shaft and removably secured to said axle housing, a roller bearing intervening between said propeller shaft and said torque tube, a roller bearing intervening between an elongated hub portion of said propeller shaft pinion and said torque tube, said propeller shaft having an external shoulder disposed between the opposed ends of said roller bearings and forming an abutment therefor and said torque tube having an internal shoulder forming an abutment for the outer end of said first mentioned bearing, an annular plate located between said torque tube and said axle housing and forming an abutment for the inner end of said second mentioned bearing, shims between said annular plate and said axle housing, and shims between said second mentioned bearing and said annular plate.

Signed at Detroit, Michigan, this 27th day of June, 1922.

HERBERT W. ALDEN.
LAWRENCE R. BUCKENDALE.